United States Patent [19]
Koyama

[11] 3,937,844
[45] Feb. 10, 1976

[54] PROCESS FOR PRODUCING PROCESSED LOW SALT SOYBEAN PASTE

[75] Inventor: Masakuni Koyama, Tokyo, Japan

[73] Assignee: Shinshu Miso Kabushiki Kaisha, Tokyo, Japan

[22] Filed: Dec. 20, 1974

[21] Appl. No.: 534,863

[52] U.S. Cl. .................................. 426/46; 426/804
[51] Int. Cl.² ....................................... A23L 1/204
[58] Field of Search ........ 426/46, 49, 352, 373, 804

[56] References Cited
UNITED STATES PATENTS 2,967,108  1/1961  Smith .................................... 426/46
3,660,111  5/1972  Hellmut .............................. 426/352

OTHER PUBLICATIONS

Smith, et al., Soybeans:Chemistry and Technology, Vol. 1, Proteins, Avi Pub. Co., Westport, Conn. pp. 12, 13, 247, 248, 391–394.

*Primary Examiner*—Jeanette M. Hunter
*Attorney, Agent, or Firm*—Cushman, Darby & Cushman

[57] ABSTRACT

An improved process for producing soy bean paste miso by adding lactic acid at the early stage of fermentation to effect lowering of the pH, thereby resulting in a salt content of less than 10%.

4 Claims, No Drawings

PROCESS FOR PRODUCING PROCESSED LOW SALT SOYBEAN PASTE

FIELD OF THE INVENTION

This invention relates to an improved process for producing processed foods such as soy bean paste and the processed foods obtained thereof.

DESCRIPTION OF THE PRIOR ART

The conventional bean processed foods, especially soy bean paste called "Miso" in Japan widely used for Japanese soup, etc. as seasoning, which is made from primarily soy beans, rice or wheat, which protein carbohydrate and fats, etc. ferment to the tasteful components with an effected by affection of brewing or ripening bacteria such as yeast.

Such soy bean paste usually contains more than 10% salt and, more usually around 13% salt, which amount is the lower limit so as to avoid deterioration and decomposition of the quality of the paste. Therefore, no soy bean paste containing salt less than 10% is currently available. Such conventional soy bean paste is not for suitable for persons suffering from hypertension.

SUMMARY OF THE INVENTION

One of the objects of this invention is to provide a processing method for the soy bean paste containing less than 10% salt and being deterioration free.

Another object of this invention is to provide a process for the preparation of a bean paste having more taste than a conventional paste having a salt content more than of 10%.

Still another object of this invention is to provide the tasty soy bean paste processed by the above process.

Further objects will be apparent with reference to the description hereunder.

The improved process according to this invention comprises the steps of adding 0.05 – 0.5% (75% density) lactic acid or organic acid into the conventional components of bean paste at its early stage, lowering the PH of said paste at said early stage, brewing and ripening said paste with salt less than 10%.

DESCRIPTION OF THE PREFERRED EMBODIMENT

The inventor knows that the bean paste containing salt less than 10% deteriorates or decomposes or rots which process is caused by the decomposing bacteria.

The inventor noticed that the lactic acid was a major organic acid contained therein which effects the lowering of the ph. The inventor then has considered that said lactic acid helped to prevent the deterioration or rotting of the paste, instead of salt. Then the inventor has made many experiments of adding the lactic acid to research the optimal amount of the lactic acid.

The experiment using 60kg of the raw materials showed that the low salt soy bean paste could be obtained. In this case, the addition of 8% salt with the lactic acid of 0.1–0.2% caused the paste to be unstable, while more than 0.5% of the lactic acid caused the paste to be sour and such paste was not suitable as an edible seasoning.

The process according to this invention was tested at 15–35°C with addition of the lactic acid at the early stage of processing under the following composition in the table.

Table 1

| Boiled Soy Bean | Rice Yeast | Salt | Lactic Acid | Ferment | Water |
|---|---|---|---|---|---|
| 41kg | 19kg(8%) | 4.8kg(8%) | 180kg(0.3%) | 480cc | 100cc |

Further analytical results of examples after 9 day from the processing are shown in the following Table 2.

Table 2

| Examples | | 1 | 2 | 3 |
|---|---|---|---|---|
| Amount of lactic acid added | (%) | 0.3 | 0.5 | 1.0 |
| PH | | 4.84 | 4.63 | 4.30 |
| Acidity I | (cc) | 12.1 | 13.1 | 15.5 |
| Acidity II | (cc) | 9.8 | 9.5 | 8.9 |
| Formalic nitrogen | (%) | 0.40 | 0.39 | 0.37 |
| Aquasoluble nitrogen | (%) | 1.05 | 1.12 | 1.08 |
| All nitrogen | (%) | 1.87 | 1.83 | 1.68 |
| Ni decompose ration | (%) | 21.23 | 21.53 | 21.85 |
| Ni dissolution ratio | (%) | 56.16 | 61.21 | 64.30 |
| Straight sugar | (%) | 14.79 | 14.62 | 19.17 |
| Water | (%) | 49.52 | 48.26 | 45.03 |
| Salt | (%) | 9.48 | 9.38 | 9.68 |

After a certain duration for ripening the usual paste, 0.3% lactic acid, vapor boiled soy bean and yeast were added, so that the salt density became lower than 10%, then the paste having been ripened for a certain duration.

As a result, the good and fine soy bean paste was obtained without any deterioration and/or rotting.

As a modification, the usual paste (30kg) + low salt paste (30kg with lactic acid as same amount of 60kg paste) = low salt soy bean paste (60kg)

As a further modification, the process further comprises addition of various seasonings to the low salt soy bean paste, to form food products such as, catchup, mayonnaise, cheese, butter, sauces and the like.

I claim:

1. In a process for producing a fermented miso soybean paste including the steps of:
   a. fermenting an aqueous cooked paste containing soybeans with yeast in the presence of salt, and
   b. brewing and ripening the paste,
   the improvement comprising adding from 0.05–0.5% lactic acid to the soybean paste at the initiation of fermentation step (a) thereby lowering the pH of the paste and maintaining the fermentation at a temperature of 15°–35°C thereby producing a soybean paste having a salt content less than 10% and devoid of deterioration.

2. The process of claim 1 wherein about 0.3% lactic acid is added.

3. In a process of producing a fermented miso soybean paste including fermenting an aqueous cooked soybeancontaining paste with a fermenting yeast source and in the presence of salt and allowing the fermentation to continue to produce a soybean-containing miso paste product, the improvement comprising adding to the initial fermentation mixture from 0.05–0.5% lactic acid, the fermentation thus producing a low salt miso product having a salt content less than 10% and free from spoilage.

4. The process of claim 3 wherein about 0.3% lactic acid is added.

* * * * *